United States Patent
Hurley

(10) Patent No.: US 8,737,789 B2
(45) Date of Patent: May 27, 2014

(54) TACTICAL CABLE

(71) Applicant: Corning Cable Systems LLC, Hickory, NC (US)

(72) Inventor: William Carl Hurley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/916,747

(22) Filed: Jun. 13, 2013

(65) Prior Publication Data

US 2013/0279865 A1  Oct. 24, 2013

Related U.S. Application Data

(63) Continuation of application No. 12/904,207, filed on Oct. 14, 2010, now Pat. No. 8,488,929.

(51) Int. Cl.
*G02B 6/44* (2006.01)

(52) U.S. Cl.
CPC .................................. *G02B 6/4432* (2013.01)
USPC ............ 385/113; 385/100; 385/110; 385/135

(58) Field of Classification Search
CPC ....................................... G02B 6/4401–6/4432
USPC .................................................. 385/109, 113
See application file for complete search history.

(56) References Cited

U.S. PATENT DOCUMENTS

| | | | |
|---|---|---|---|
| 5,822,485 A | 10/1998 | Nelson et al. | 385/112 |
| 5,852,698 A | 12/1998 | Bringuier | 385/113 |
| 6,389,204 B1 | 5/2002 | Hurley | 385/102 |
| 6,449,412 B1 | 9/2002 | Rutterman et al. | 385/103 |
| 6,487,347 B2 | 11/2002 | Bringuier | 385/113 |
| 6,775,443 B2 | 8/2004 | Bringuier et al. | 385/102 |
| 6,775,444 B1 | 8/2004 | Hurley | 385/104 |
| 6,801,695 B2 | 10/2004 | Lanier et al. | 385/100 |
| 6,925,235 B2 | 8/2005 | Lanier et al. | 385/100 |
| 7,113,680 B2 | 9/2006 | Hurley et al. | 385/113 |
| 7,340,134 B1 | 3/2008 | Hudson, II et al. | 385/100 |
| 7,397,991 B1 | 7/2008 | Register | 385/102 |
| 7,668,427 B2 | 2/2010 | Register | 385/102 |
| 7,995,885 B2 | 8/2011 | Register | 385/102 |
| 8,488,929 B2 * | 7/2013 | Hurley | 385/113 |
| 2002/0001443 A1 | 1/2002 | Bringuier | 385/113 |
| 2009/0154888 A1 | 6/2009 | Abbott, III et al. | 385/124 |
| 2009/0169163 A1 | 7/2009 | Abbott, III et al. | 385/127 |
| 2010/0209059 A1 | 8/2010 | Conrad et al. | 385/110 |
| 2011/0091173 A1 | 4/2011 | Register, Iii | 385/113 |

OTHER PUBLICATIONS

Corning Cable Systems LLC: "MIC riser Cables 2-24 Fiber LANscape Pretium Solutions Product" Product Specifications, Oct. 1, 2005, XP002618157, http://www.testmart.com/webdata/mfr_pdfs/CORNIN/pd30028.pdf.

Corning Cable Systems LLC: "MIC 250 Fiber Optic Cables 12 and 24 Fibers an Evolant Solutions Product" Product Specifications, Jul. 1, 2008, XP002618158, http://CCSwebapps.corning.com/web/library/litindex.nsf/$ALL/EVO-859-EN/$FILE/EVO-859-EN.pdf.

* cited by examiner

*Primary Examiner* — Eric Wong

(74) *Attorney, Agent, or Firm* — Russell S. Magaziner

(57) ABSTRACT

Robust fiber optic cables and assemblies having low attenuation multimode optical fibers. The cables have low attenuation in tensile and mandrel wrap tests, and can have thermoplastic urethane jackets coextruded over tensile strength members that allow the cables to be pulled by the jackets. The cables have relatively small cross-sections yet have sufficient robustness to be deployed in extreme environments such as cellular tower applications.

20 Claims, 6 Drawing Sheets

TACTICAL CABLE

PRIORITY APPLICATION

This is a continuation of U.S. patent application Ser. No. 12/904,207 filed on Oct. 14, 2010, the content of which is relied upon and incorporated herein by reference in its entirety, and the benefit of priority under 35 U.S.C. §120 is hereby claimed.

TECHNICAL FIELD

The present disclosure relates generally to fiber optic cables and assemblies having low attenuation multimode optical fibers.

BACKGROUND

Conventional cables have been used to provide data and electrical power service to extreme or difficult deployment environments. Cellular towers are one type of application which requires relatively rugged cables, in particular open structure cell towers without a closed cable routing duct. Coaxial cables have been used in cellular tower applications, but their low bandwidth characteristics require a large cable cross-section in order to provide adequate data service. Large cable cross-sections, however, may be subject to excessive wind loading in open tower structures. Large cross-sections are also difficult to accommodate in the limited space available in cell towers having a closed duct to house data cables. Fiber optic cables have also been used to service cellular towers. Fiber optic cables have higher bandwidth capability with a much smaller cross-section than coaxial cables of similar bandwidth capacity. However, existing cables may lack the toughness for pulling and/or routing in exposed environments such as cell towers or may have unacceptable bend or strain-induced losses during deployment. Conventional cables may also use fiber types (e.g. high bandwidth single mode) that require expensive transmitters such as Fabry-Perot lasers.

SUMMARY

According to a first embodiment, a fiber optic cable comprises a polymer jacket enclosing a cavity, six optical fibers enclosed within the cavity, and a tensile yarn strain relief element in the cavity and contacting the polymer jacket and the optical fibers, wherein an outside diameter of the cable jacket is in the range of 6-8 mm, and wherein when the cable is subjected to a tensile load of 300 lbs, each optical waveguide experiences a delta attenuation of less than 0.2 dB at 850 nm and 1300 nm.

According to a second embodiment, a fiber optic cable comprises a polymer jacket enclosing a cavity, twelve optical fibers enclosed within the cavity, and a tensile yarn strain relief element in the cavity and contacting the polymer jacket and the optical fibers, wherein an outside diameter of the jacket is in the range of 7-9 mm, and wherein when the cable is wrapped four times around a mandrel having a diameter of 10 mm, each optical waveguide experiences a delta attenuation of less than 0.6 dB at 850 nm.

According to one aspect of the present embodiments, bend insensitive multimode fibers can be utilized that provide low attenuation and allow the use of inexpensive VCSEL transmitters.

According to another aspect of the present embodiments, the cable jacket can comprise a thermoplastic urethane extruded over tensile strength members that allow installations of the cables by simply pulling on the cable jacket.

According to another aspect of the present embodiments, the cables may have relatively small cross-sections while maintaining sufficient durability for outdoor installations.

These and other advantages of the disclosure will be further understood and appreciated by those skilled in the art by reference to the following written specification, claims and appended drawings.

BRIEF DESCRIPTION OF THE FIGURES

A more complete understanding of the present disclosure may be had by reference to the following detailed description when taken in conjunction with the accompanying drawings wherein.

DETAILED DESCRIPTION

The embodiments will now be described more fully hereinafter with reference to the accompanying drawings in which exemplary embodiments are shown. However, practice of the disclosure may be embodied in many different forms and should not be construed as limited to the embodiments set forth herein. The exemplary embodiments are provided so that this disclosure will be both thorough and complete, and will fully convey the scope of the claims and enable one of ordinary skill in the art to make, use and practice the same. Like reference numbers refer to like elements throughout the various drawings.

Figure 1:
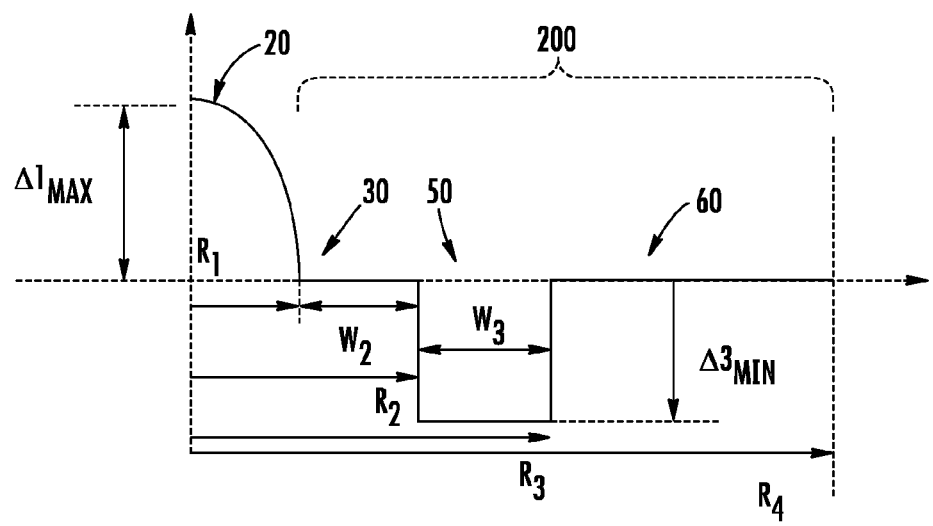
FIG. 1 is a schematic representation of the refractive index profile of a cross-section of the glass portion of an embodiment of a multimode optical fiber.
Figure 2:
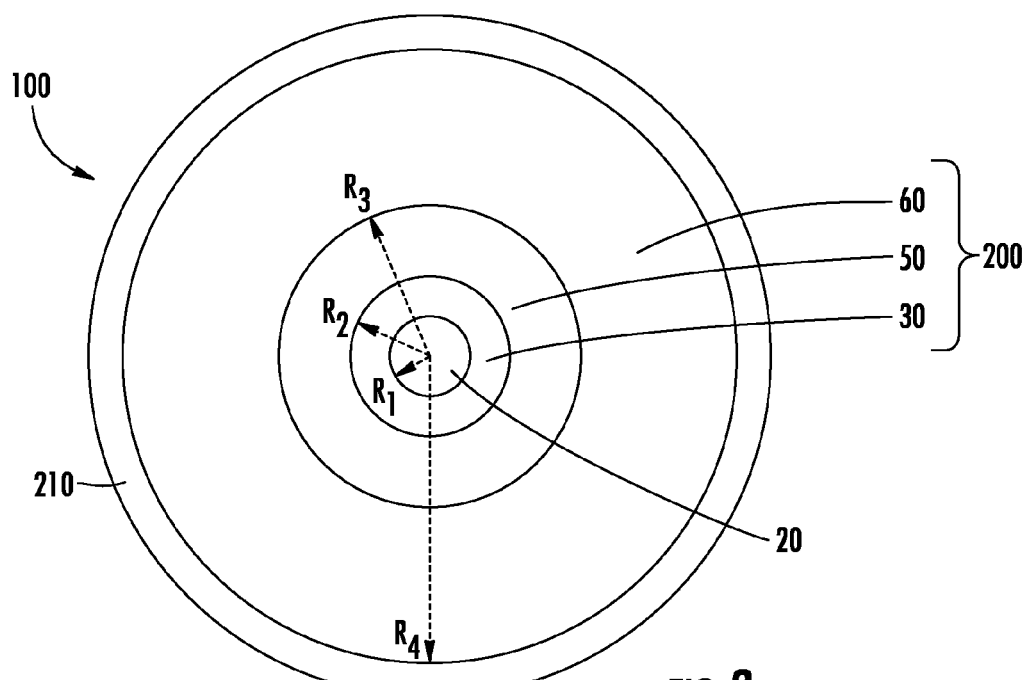
FIG. 2 is a schematic representation of a cross-sectional view of the optical fiber of FIG. 1.

FIG. 1 shows a schematic representation of the refractive index profile of a cross-section of the glass portion of an embodiment of a multimode optical fiber 100 comprising a glass core 20 and a glass cladding 200, the cladding comprising an inner annular portion 30, a depressed-index annular portion 50, and an outer annular portion 60. FIG. 2 is a schematic representation (not to scale) of a cross-sectional view of the optical waveguide fiber of FIG. 1. The core 20 has outer radius R1 and maximum refractive index delta $\Delta 1MAX$. The inner annular portion 30 has width W2 and outer radius R2. Depressed-index annular portion 50 has minimum refractive index delta percent $\Delta 3MIN$, width W3 and outer radius R3. The depressed-index annular portion 50 is shown offset, or spaced away, from the core 20 by the inner annular portion 30. The annular portion 50 surrounds and contacts the inner annular portion 30. The outer annular portion 60 surrounds and contacts the annular portion 50. The clad layer 200 is surrounded by at least one coating 210, which may in some embodiments comprise a low modulus primary coating and a high modulus secondary coating.

The inner annular portion 30 has a refractive index profile Δ2(r) with a maximum relative refractive index Δ2MAX, and a minimum relative refractive index Δ2MIN, where in some embodiments Δ2MAX=Δ2MIN. The depressed-index annular portion 50 has a refractive index profile Δ3(r) with a minimum relative refractive index Δ3MIN. The outer annular portion 60 has a refractive index profile Δ4(r) with a maximum relative refractive index Δ4MAX, and a minimum relative refractive index Δ4MIN, where in some embodiments Δ4MAX=Δ4MIN. Preferably, Δ1MAX>Δ2MAX>Δ3MIN. In some embodiments, the inner annular portion 30 has a substantially constant refractive index profile, as shown in FIG. 1 with a constant Δ2(r); in some of these embodiments, Δ2(r)=0%. In some embodiments, the outer annular portion 60 has a substantially constant refractive index profile, as shown in FIG. 1 with a constant Δ4(r); in some of these embodiments, Δ4(r)=0%. The core 20 has an entirely positive refractive index profile, where Δ1(r)>0%. R1 is defined as the radius at which the refractive index delta of the core first reaches value of 0.05%, going radially outwardly from the centerline. Preferably, the core 20 contains substantially no fluorine, and more preferably the core 20 contains no fluorine. In some embodiments, the inner annular portion 30 preferably has a relative refractive index profile Δ2(r) having a maximum absolute magnitude less than 0.05%, and Δ2MAX<0.05% and Δ2MIN>−0.05%, and the depressed-index annular portion 50 begins where the relative refractive index of the cladding first reaches a value of less than −0.05%, going radially outwardly from the centerline. In some embodiments, the outer annular portion 60 has a relative refractive index profile Δ4(r) having a maximum absolute magnitude less than 0.05%, and Δ4MAX<0.05% and Δ4MIN>−0.05%, and the depressed-index annular portion 50 ends where the relative refractive index of the cladding first reaches a value of greater than −0.05%, going radially outwardly from the radius where Δ3MIN is found.

The bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more down-dopants such as fluorine, boron, individually or mixtures thereof. The depressed-index annular portion may have a refractive index delta less than about −0.2% and a width of at least about 1 micron, the depressed-index annular portion being spaced from said core by at least about 0.5 microns.

In some embodiments, the bend resistant multimode optical fibers comprise a cladding with voids, the voids in some preferred embodiments are non-periodically located within the depressed-index annular portion. "Non-periodically located" means that if takes a cross-section (such as a cross-section perpendicular to the longitudinal axis) of the optical fiber, the non-periodically disposed voids are randomly or non-periodically distributed across a portion of the fiber (e.g. within the depressed-index annular region). Similar cross-sections taken at different points along the length of the fiber will reveal different randomly distributed cross-sectional hole patterns, i.e., various cross-sections will have different hole patterns, wherein the distributions of voids and sizes of voids do not exactly match for each such cross-section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture (NA) of greater than 0.14, more preferably greater than 0.17, even more preferably greater than 0.18, and most preferably greater than 0.185, and an overfilled bandwidth greater than 1.5 GHz-km at 850 nm. By way of example, the numerical aperture for the multimode optical fiber 100 is between about 0.185 and about 0.215.

50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. By way of example, these high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the core extends radially outwardly from the centerline to a radius R1, wherein 10≤R1≤40 microns, more preferably 20≤R1≤40 microns. In some embodiments, 22≤R1≤34 microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm. Optical fiber 100 is also disclosed in U.S. patent application Ser. No. 12/250,987 filed on Oct. 14, 2008, now U.S. Pat. No. 7,374,043, and Ser. No. 12/333,833 filed on Dec. 12, 2008, the disclosures of which are incorporated herein by reference.

Figure 3:
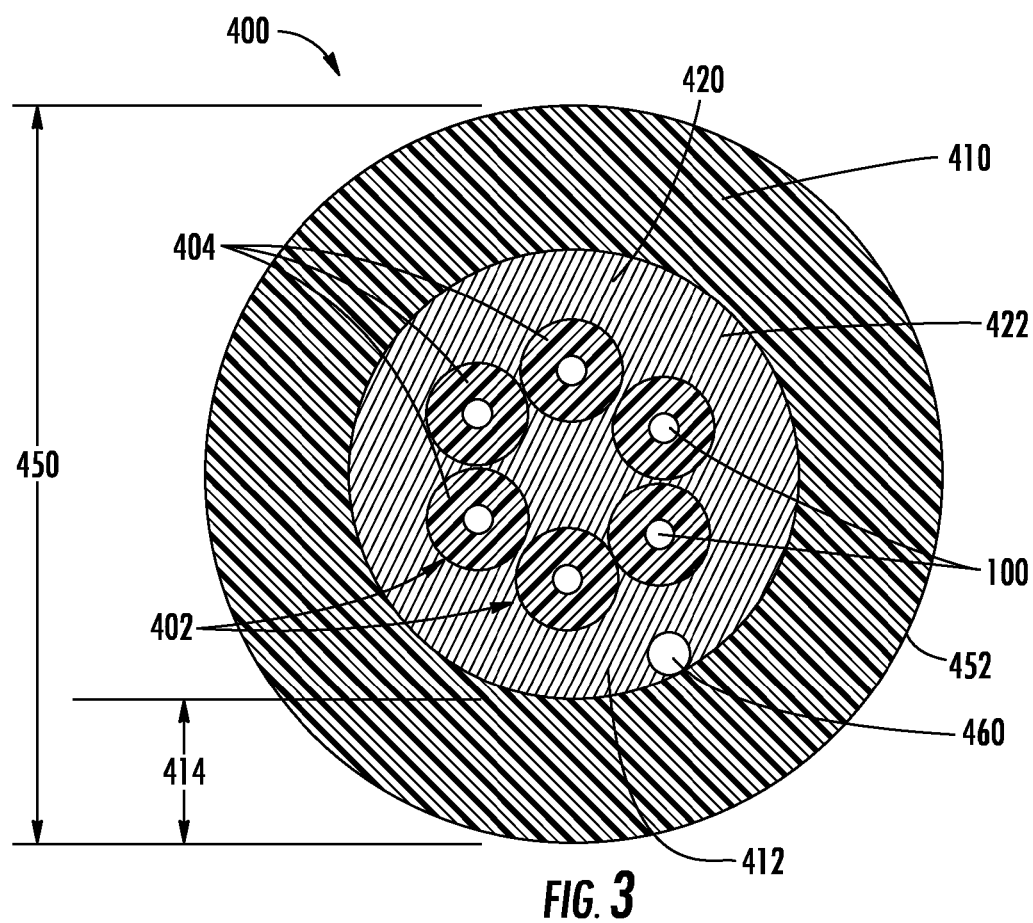
FIG. 3 is a cross-section of a cable according to a first embodiment.

FIG. 3 is a cross-section of a cable 400 according to one embodiment having a plurality of optical waveguides 402. The cable 400 includes a cable jacket 410 forming a cavity 412, a strain-relief element 420 enclosed in the cable jacket 410, and six optical waveguides 402. In the illustrated embodiment, the optical waveguides 402 correspond to the optical fiber 100 illustrated in FIGS. 1-2 with tight buffer layers 404 formed over the fibers. The cable jacket 410 has a thickness 414. The cable 400 has a diameter 450 and a cross-sectional area 452 defined by the outer perimeter of the cable jacket 410. In the illustrated embodiments, the strain-relief element 420 comprises tensile yarns that occupy a free space area 422 in the cable jacket 410. The strain-relief element 420 can be tightly packed around the optical waveguides 402 so that they are retained separate from the jacket 410, although one or more waveguides 402 may contact the jacket 410 at one or more locations along the cable 400.

The cable jacket 410 is constructed from a polymer. In one embodiment, the jacket 410 is formed from thermoplastic urethane (TPU). For a six fiber cable 400, the outside diameter 450 can be in the range of about 6.0-8.0 mm, and the jacket thickness can be in the range of about 1.3-1.7 mm. In another embodiment, the outside diameter 450 of the jacket is in the range of 6.5-7.5 mm. The waveguides 402 can be stranded. S-Z stranding, for example, allows for high line speeds during cable manufacture. U.S. Pat. No. 6,775,444 discloses methods of S-Z stranding suitable for use with the present embodiments.

EXAMPLE 1

A cable 400 as shown in FIG. 3 has six optical waveguides 402. The strain-relief element 420 is formed from aramid or polyester tensile yarn. The cable jacket 410 is TPU. The TPU is pressure extruded around the cable core, which causes some of the strain-relief element 420 to become bonded to the jacket 410. A ripcord 460 is included to provide ease of access to the cable. The cable outside diameter 450 is 6.9 mm. The jacket thickness 414 is about 1.5 mm. The waveguides 402 include bend insensitive multimode 50 micron nominal outside diameter optical fibers 100 available under the ClearCurve® brand name from Corning Incorporated, with TBII® 900 micron PVC tight buffer layers 404.

According to the above embodiment, the TPU jacket 410 and the aramid fibers 422 increase the robustness of the cable 400 and allow the cable to be installed by simply pulling on the jacket, rather than by use of a pulling grip as is customary in conventional designs. The use of low attenuation multi-mode fibers 100 allows the use of relatively inexpensive, high bandwidth VCSEL transmitters. The multimode fibers provide high bandwidth, yet the cable has a relatively small cross-section. The cable can therefore be used in applications where concerns relating to wind loading are significant, such as in exterior cellular tower deployments.

Figure 4:
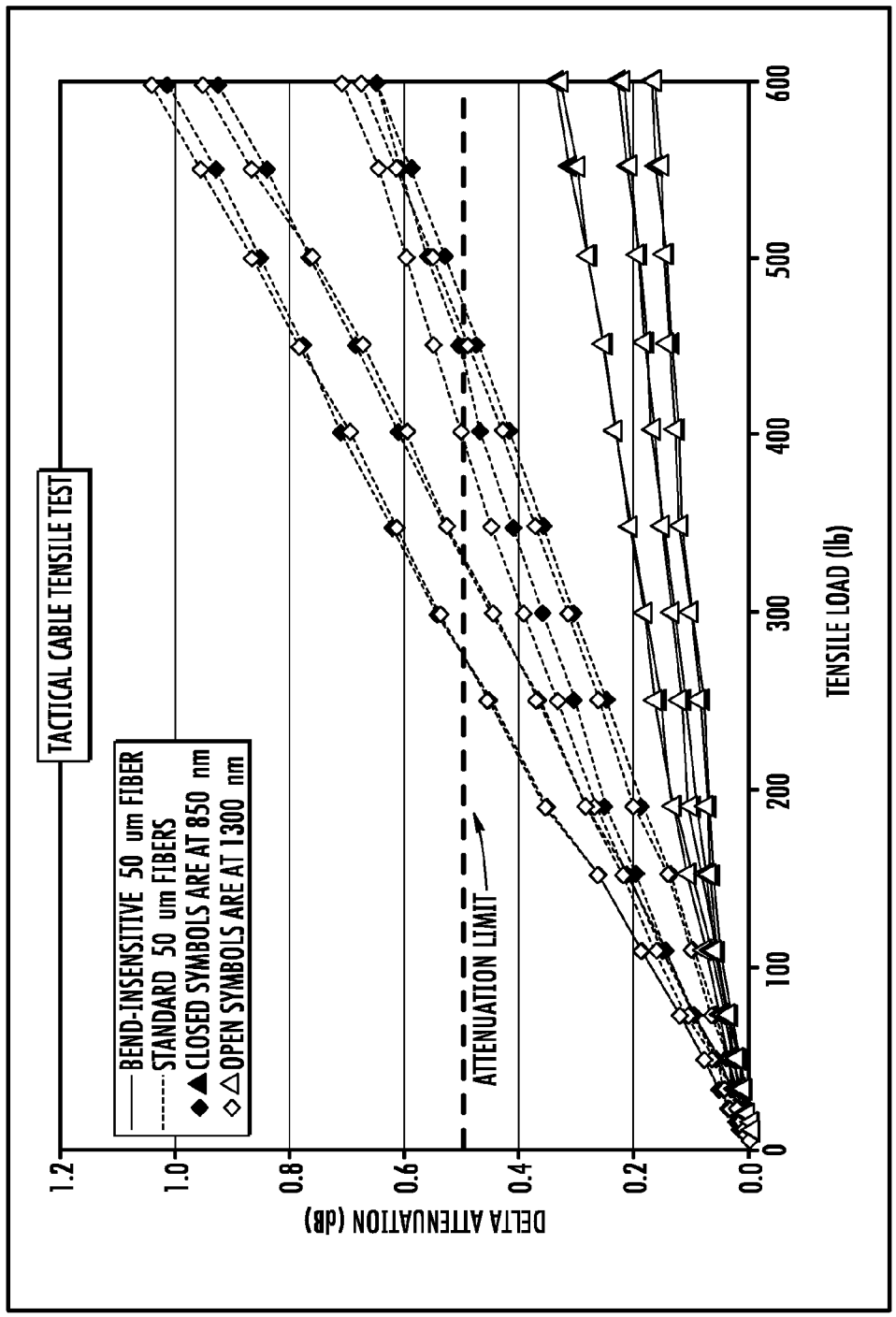
FIG. 4 is a plot of delta attenuation in cable tensile tests comparing standard optical fibers with bend insensitive multimode fibers.

FIG. 4 is a plot of delta attenuation in tensile tests for standard 50 micron fibers, compared with optical waveguides 402 having tight buffered bend insensitive 50 micron multimode fibers 100, in the cable 400. The plot illustrates delta attenuation when the cable is subjected to varying tensile loads. As shown in FIG. 4, the cable 400 undergoes a tensile load of 300 lbs. and experiences a delta attenuation in each fiber of less than 0.2 dB at 850 nm and 1300 nm. The cable 400 undergoes a tensile load of 400 lbs and experiences a delta attenuation in each fiber of less than 0.3 dB at 850 nm and 1300 nm. The cable 400 undergoes a tensile load of 500 lbs and experiences a delta attenuation in each fiber of less than 0.4 dB at 850 nm and 1300 nm.

Figure 5:
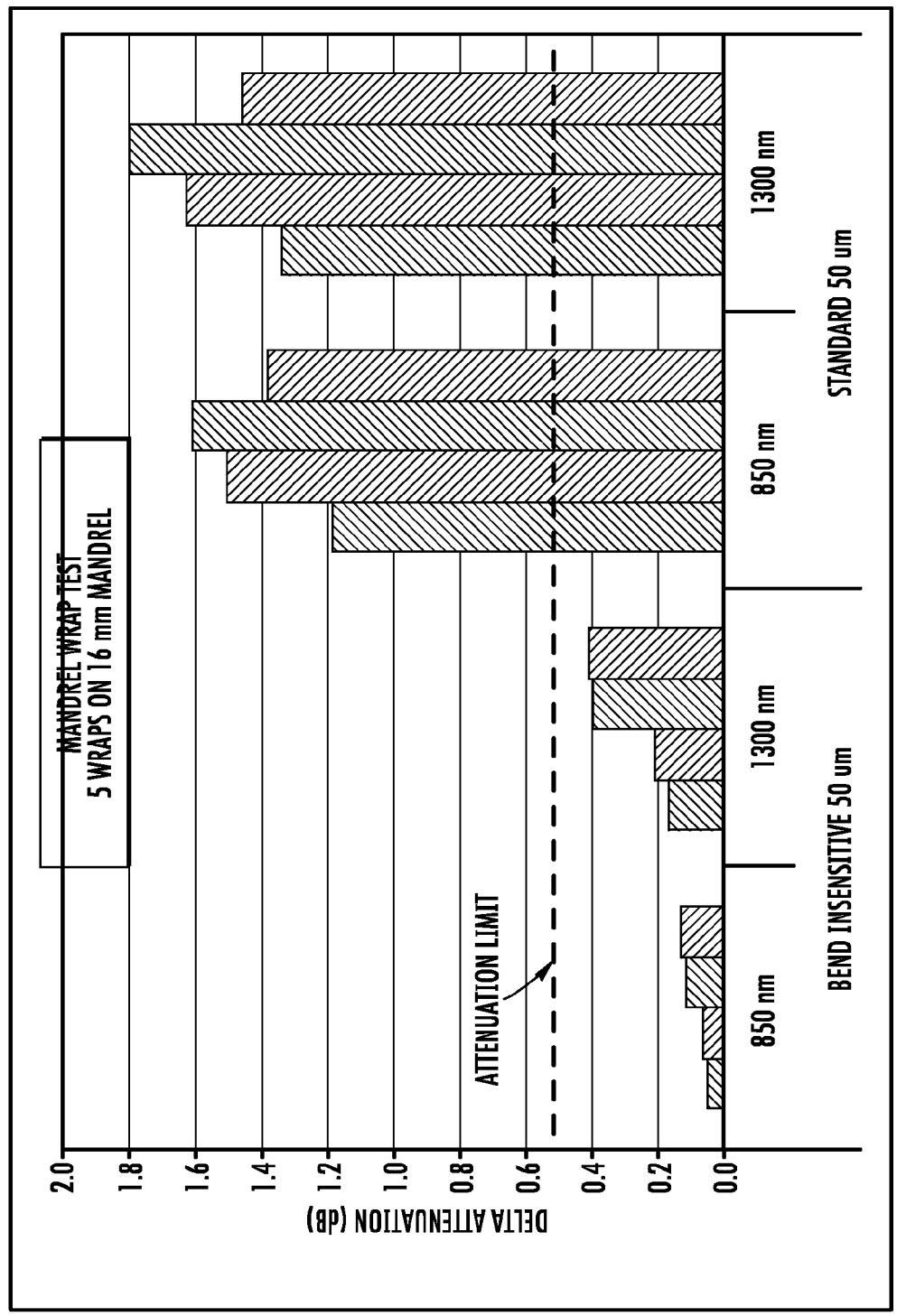
FIG. 5 is a plot of delta attenuation in cable mandrel wrap tests comparing standard optical fibers with bend insensitive multimode fibers.

FIG. 5 is a plot of delta attenuation in mandrel wrap tests for standard 50 micron fibers compared with optical waveguides 402 having bend insensitive 50 micron multimode fibers 100 in the cable 400. The plot illustrates delta attenuation when the cable is wrapped five times around a 16 mm diameter mandrel. As shown in FIG. 5, the cable 400 experiences a delta attenuation in each fiber of less than 0.6 dB at both 850 and 1300 nm. The cable 400 experiences a delta attenuation in each fiber of less than 0.2 dB at 850 nm.

Figure 6:
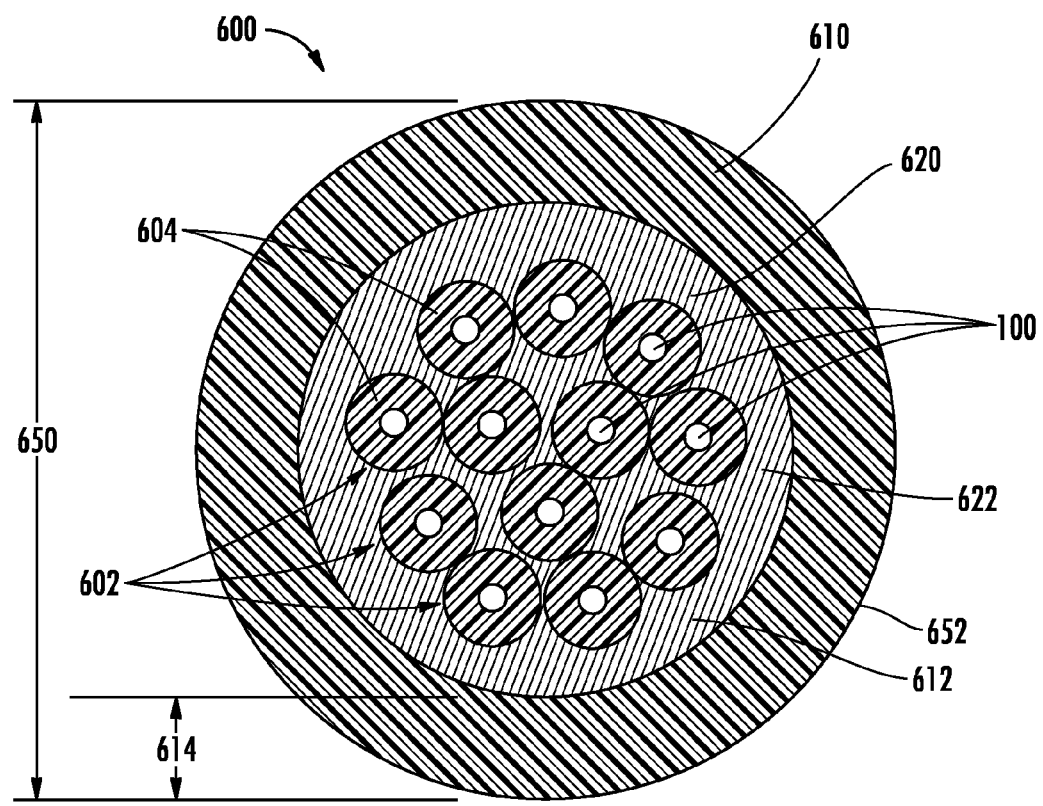
FIG. 6 is a cross-section of a cable according to a second embodiment.

FIG. 6 is a cross-section of a cable 600 according to a second embodiment having a plurality of optical waveguides 602. The cable 600 includes a cable jacket 610 forming a cavity 612, a strain-relief element 620 enclosed in the cable jacket 610, and twelve optical waveguides 602. In the illustrated embodiment, the optical waveguides 402 correspond to the optical fiber 100 illustrated in FIGS. 1-2 with tight buffer layers 604. The cable jacket 610 has a thickness 614. The cable 600 has a diameter 650 and a cross-sectional area 652 defined by the outer perimeter of the cable jacket 610. In the illustrated embodiments, the strain-relief element 620 comprises tensile yarns that occupy a free space area 622 in the cable jacket 610. The optical waveguides 602 may be tightly retained within the strain-relief element 620, but contact with the jacket 610 may be possible at one or more locations along the length of the cable 600.

The cable jacket 610 is constructed from a polymer. In one embodiment, the jacket 610 is formed from thermoplastic urethane. For a twelve fiber cable 600, the outside diameter 650 can be in the range of about 7-9 mm, and the jacket thickness can be in the range of about 1.3-1.7 mm. In another embodiment, the outside diameter 650 of the jacket is in the range of 7.5-8.5 mm. The strain-relief element 420 can be aramid tensile yarn. The waveguides 602 can be S-Z stranded.

Figure 7:
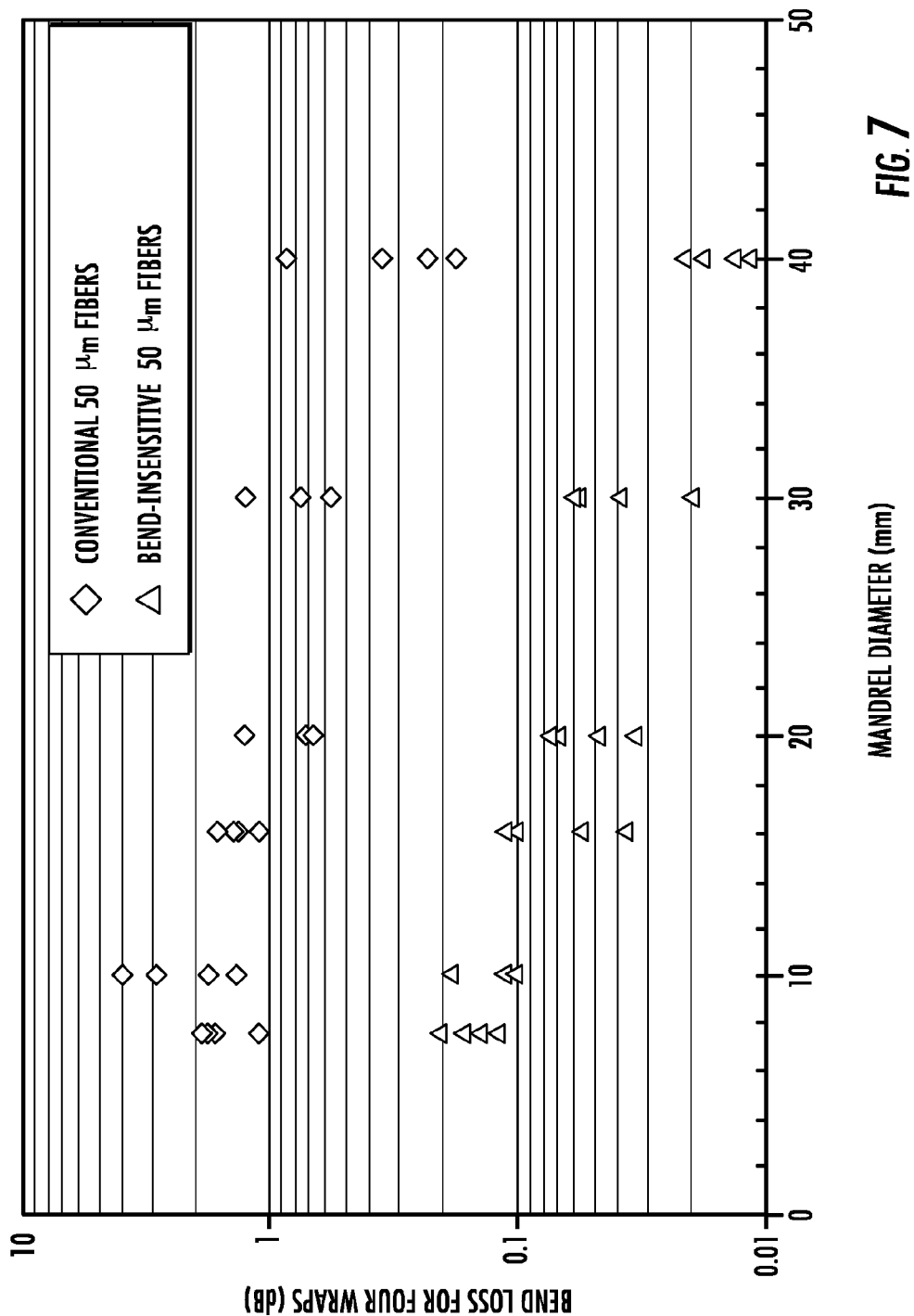
FIG. 7 is a plot of delta attenuation in mandrel wrap tests.

FIG. 7 is a plot of delta attenuation at 850 nm in mandrel wrap tests for standard 50 micron fibers compared with optical waveguides 602 having bend insensitive 50 micron multimode fibers 100 in the cable 600. The cable 600 was provided with four conventional tight buffered 50 micron fibers, four tight buffered multimode fibers 100, and four additional tight buffered fibers. The plot of FIG. 7 illustrates delta attenuations in the conventional fibers and in the bend insensitive fibers 100 when wrapping the cable 400 four times about mandrels of varying diameters. As shown in FIG. 7, each of the fibers 100 experiences a delta attenuation of less than 0.6 dB when wrapped four times about a 10 mm diameter mandrel. Each of the fibers 100 experienced a delta attenuation of less than 0.3 dB when wrapped four times about a 20 mm diameter mandrel. Each of the fibers 100 experienced a delta attenuation of less than 0.1 dB when wrapped four times about a 30 mm diameter mandrel. Each of the fibers 100 experienced a delta attenuation of less than 0.07 dB when wrapped four times about a 40 mm diameter mandrel.

EXAMPLE 2

A cable 600 as shown in FIG. 6 has twelve tight buffered optical fibers 100. The strain-relief element 620 is formed from aramid yarn. The cable jacket 610 is a thermoplastic urethane polymer. The TPU is pressure extruded around the cable core, which causes some of the aramid to become bonded to the jacket 610. The cable outside diameter 650 is 8 mm. The jacket thickness 614 is about 1.5 mm. The waveguides 602 include bend insensitive multimode 50 micron nominal outside diameter optical fibers 100 available under the ClearCurve® brand name from Corning Incorporated, with TBII® 900 micron PVC tight buffer layers 604.

Optical fibers are available under the name ClearCurve®, including ClearCurve® multimode and single mode fibers, with TBII® tight buffer layers, from Corning Incorporated of Corning N.Y., and may be utilized in the cables 400, 600.

An encircled flux (EF) launch is used for testing the optical performance of multimode fiber optic assemblies disclosed herein. The EF launch into the core of the multimode optical fiber fills the core of the optical fiber with a specific profile (i.e., specific percentage of power within a given radii from the center of the optical fiber). More specifically, EF is determined by the near field measurement of the optical signal at the launch end of the optical fiber. The measured near field result is a function I(r), of radius, r, away from the optical center of the core, which is used to generate the EF function given by Equation (1) below.

$$EF(r) = \frac{\int_0^r xI(x)dx}{\int_0^R xI(x)dx}$$ Equation (1)

"R" is an integration limit defined as 1.15× of the nominal core radius. The EF launch is a set of particular radial control points that are defined by an EF upper limit and an EF lower limit of encircled flux values for the particular radial control points. A compliant EF launch falls within the defined upper and lower limits for the particular control points, otherwise the launch is either overfilled or underfilled.

The optical performance of multimode fiber optic assemblies according to the present embodiments is surprisingly impressive compared with conventional multimode fiber optic assemblies. Testing was performed to quantify the improved performance of multimode fiber optic assemblies disclosed herein. Specifically, the performance of the multimode fiber optic assemblies were compared with conventional multimode fiber optic assemblies having a 50 micron core multimode optical fiber available from Corning, Inc. of Corning, N.Y. under the tradename InfiniCor® SX+. Different types of testing were conducted to evaluate performance under different conditions encountered by the craft. For instance, testing was conducted to determine the insertion loss of the multimode fiber optic assemblies. Insertion loss is the optical attenuation that occurs between mated fiber optic connectors and is used for determining budget losses in an optical network. For instance, the design of the optical network may allow for total insertion loss of 0.5 dB and if each mated fiber optic connector pair has an average insertion loss of 0.1 dB, then the design would be limited to a maximum of five fiber optic connector pairs to meet the loss budget for the optical network. Consequently, improved insertion loss is valuable for optical networks. Bend performance testing was also performed to determine multimode fiber optic assembly performance when wrapped into relatively small bend diameters. Preserving optical performance of multimode fiber optic assemblies during bending is advantageous since optical networks typically include many bends during routing, slack storage and the like. Insertion loss testing was performed using multimode fiber optic assemblies for comparison with conventional multimode fiber optic assemblies as discussed above. Generally speaking, multimode fiber optic assemblies have about one-half or less of the insertion loss compared with similar conventional multimode fiber optic assemblies. By way of example, multimode fiber optic assemblies disclosed herein have an insertion loss of about 0.04 dB or less per mated connector pair, which is about half of the insertion loss of a similar conventional multimode fiber optic mated pair.

In this specification, "diameter" is used to describe the size of the cable and optical fibers. The term does not require a perfectly circular cross-section for the elements described as having a diameter. Instead, "diameter" allows for some ovality or distortion of cable elements, and may represent an average diameter of a cable cross-section.

The foregoing is a description of various embodiments that are given here by way of example only. Although multimode fiber optic cables assemblies including bend performance fiber in at least a portion thereof have been described with reference to preferred embodiments and examples thereof, other embodiments and examples may perform similar functions and/or achieve similar results. All such equivalent embodiments and examples are within the spirit and scope of the disclosure and are intended to be covered by the appended claims.

I claim:

1. A fiber optic cable, comprising:
   a polymer jacket enclosing a cavity;
   optical fibers enclosed within the cavity, wherein the optical fibers are multimode optical fibers comprising a glass core and glass cladding, wherein the cladding comprises annular portions having differing indexes of refraction from one another, wherein the multimode optical fibers exhibit a spectral attenuation of less than 2.5 dB/km at 850 nm and less than 0.8 dB/km at 1300 nm; and
   a tensile yarn strain relief element in the cavity and contacting the polymer jacket, the optical fibers contacting the strain relief element, wherein the tensile yarn strain relief element is formed from tensile yarn, wherein the tensile yarn is tightly packed around the optical fibers, and wherein some of the tensile yarn strain relief element is bonded to the polymer jacket;
   wherein when the cable is subjected to a tensile load of 300 lbs, each optical fiber experiences a delta attenuation of less than 0.2 dB at optical wavelengths of 850 nm and 1300 nm.

2. The cable of claim 1, wherein when the cable is subjected to a tensile load of 400 lbs, each optical fiber experiences a delta attenuation of less than 0.3 dB at optical wavelengths of 850 nm and 1300 nm.

3. The cable of claim 1, wherein when the cable is subjected to a tensile load of 500 lbs, each optical fiber experiences a delta attenuation of less than 0.4 dB at optical wavelengths of 850 nm and 1300 nm.

4. The cable of claim 1, wherein when the cable is wrapped around a 16 mm diameter mandrel five times, each optical fiber experiences a delta attenuation of less than 0.6 dB at optical wavelengths of 850 nm and 1300 nm.

5. The cable of claim 1, wherein the jacket comprises thermoplastic.

6. The cable of claim 1, wherein the tensile yarn comprises aramid fibers.

7. The cable of claim 1, wherein the thickness of the jacket is in the range of 1.3-1.7 mm.

8. The cable of claim 1, wherein the outside diameter of the jacket is in the range of 6.5-7.5 mm.

9. The cable of claim 1, wherein the bond between the tensile yarn and the polymer jacket is a product by the process of pressure extrusion.

10. The cable of claim 1, wherein the optical fibers are tight buffered fibers.

11. A fiber optic cable, comprising:
   a polymer jacket enclosing a cavity having an outside diameter of the jacket in at least one of the range of 6-8 mm and 7-9 mm;
   optical fibers enclosed within the cavity, wherein the optical fibers comprise a glass core and glass cladding, wherein the cladding comprises annular portions, wherein one of the annular portions has an index of refraction that is less than another of the annular portions, when the cable is wrapped four times around a mandrel of 20 mm diameter, each optical fiber experiences a delta attenuation of less than 0.3 dB at an optical wavelength of 850 nm;
   a tensile yarn strain relief element in the cavity and contacting the polymer jacket, the optical fibers contacting the strain relief element, wherein the tensile yarn is tightly packed around the optical fibers, and wherein some of the tensile yarn strain relief element is bonded to the polymer jacket;
   wherein when the cable is wrapped four times around a mandrel of 10 mm diameter, each optical fiber experiences a delta attenuation of less than 0.6 dB at an optical wavelength of 850 nm.

12. The cable of claim 11, wherein the optical fibers are multimode optical fibers that exhibit a spectral attenuation of less than 2.5 dB/km at 850 nm and less than 0.8 dB/km at 1300 nm.

13. The cable of claim 11, when the cable is wrapped four times around a mandrel of 40 mm diameter, each optical fiber experiences a delta attenuation of less than 0.07 dB at an optical wavelength of 850 nm.

14. The cable of claim 11, wherein the jacket comprises thermoplastic.

15. The cable of claim 11, wherein the tensile yarn comprises aramid fibers.

16. The cable of claim 11, wherein the optical fibers are S-Z stranded.

17. The cable of claim 11, wherein the thickness of the jacket is in the range of 1.3-1.7 mm.

18. The cable of claim 11, wherein the outside diameter of the jacket is in the range of 7.5-8.5 mm.

19. The cable of claim 11, wherein the bond between the tensile yarn and the polymer jacket is a product by the process of pressure extrusion.

20. The cable of claim 11, wherein the optical fibers are tight buffered fibers.

* * * * *